April 6, 1937.  T. P. WRIGHT  2,076,259
ANTIVIBRATION VANE
Filed May 22, 1935   2 Sheets-Sheet 1
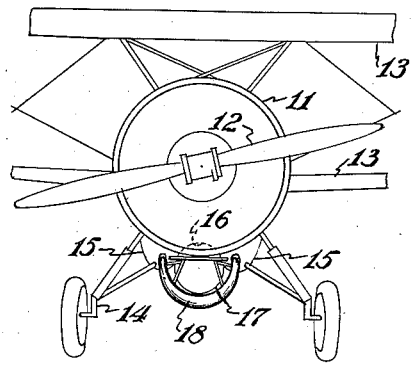
Fig. 1.
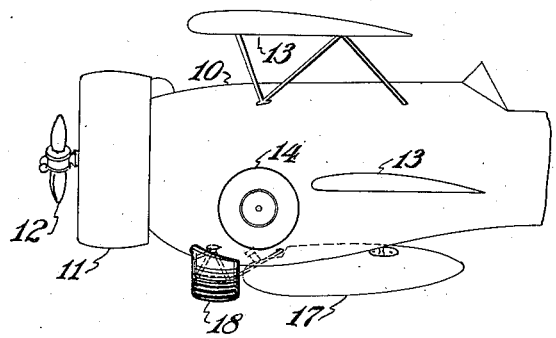
Fig. 2.
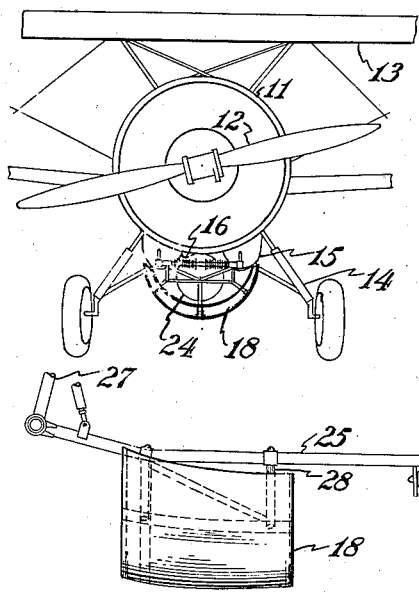
Fig. 3.
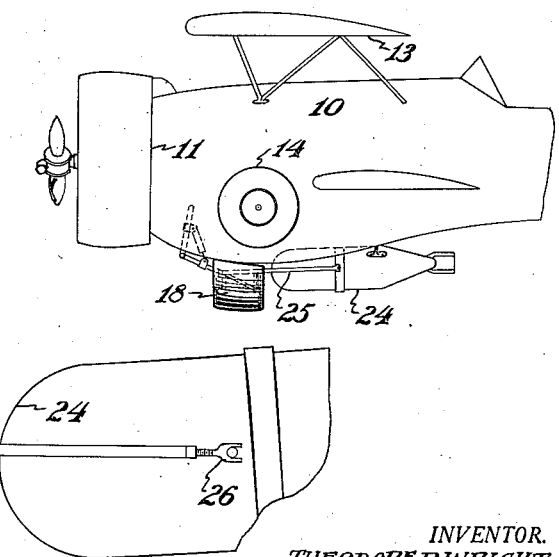
Fig. 4.
Fig. 5.
INVENTOR.
THEODORE P. WRIGHT
BY
ATTORNEY.

April 6, 1937.  T. P. WRIGHT  2,076,259
ANTIVIBRATION VANE
Filed May 22, 1935  2 Sheets-Sheet 2

INVENTOR.
THEODORE P. WRIGHT
BY
ATTORNEY.

Patented Apr. 6, 1937

2,076,259

UNITED STATES PATENT OFFICE 2,076,259

ANTIVIBRATION VANE

Theodore P. Wright, Buffalo, N. Y., assignor, by mesne assignments, to Curtiss-Wright Corporation, a corporation of New York Application May 22, 1935, Serial No. 22,716

2 Claims. (Cl. 244—130)

This invention relates to aircraft, and is more particularly concerned with apparatus for smoothing the air flow past auxiliary bodies carried by aircraft.

In certain types of military aircraft, auxiliary bodies such as bombs or gasoline tanks are suspended below the fuselage in spaced relation thereto, these bodies having a streamline form to minimize their resistance. Aircraft of this type are usually arranged to operate either with or without the auxiliary equipment, and it has been found that the use of the auxiliary body sometimes affects the air flow over the fuselage to such a degree that turbulent air currents are produced at the empennage, causing vibration or interfering with effective operation of the control surfaces. This invention provides means for smoothing out these turbulent air currents by which substantially the same flight characteristics are obtained for the airplane whether the auxiliary tank or bomb be attached thereto or not.

An object of the invention is to provide means for smoothing the air flow over auxiliary bodies attached outside of an aircraft fuselage.

A further object is to provide a vane located forwardly of an auxiliary body on an aircraft fuselage by which the air flow over the auxiliary body is controlled.

Further objects include the design of an air controlling vane for an auxiliary body by which optimum air flow characteristics are obtained, and means for attachment of an air flow controlling vane to the fuselage of an aircraft.

Further objects will become apparent in reading the annexed specification and claims and in viewing the drawings, in which similar numbers indicate similar parts, and in which:

Fig. 1 is a front elevation of an aircraft embodying the device of this invention;

Fig. 2 is a side elevation showing the type of aircraft as indicated in Fig. 1, with the landing gear retracted;

Fig. 3 is a front elevation of an aircraft showing a slightly different embodiment of the invention;

Fig. 4 is a side elevation similar to Fig. 2, showing that form of the invention as embodied in Fig. 3;

Fig. 5 is an enlarged detail view of the air flow control vane and its attachment to certain elements of the aircraft and/or auxiliary body;

Figure 6:
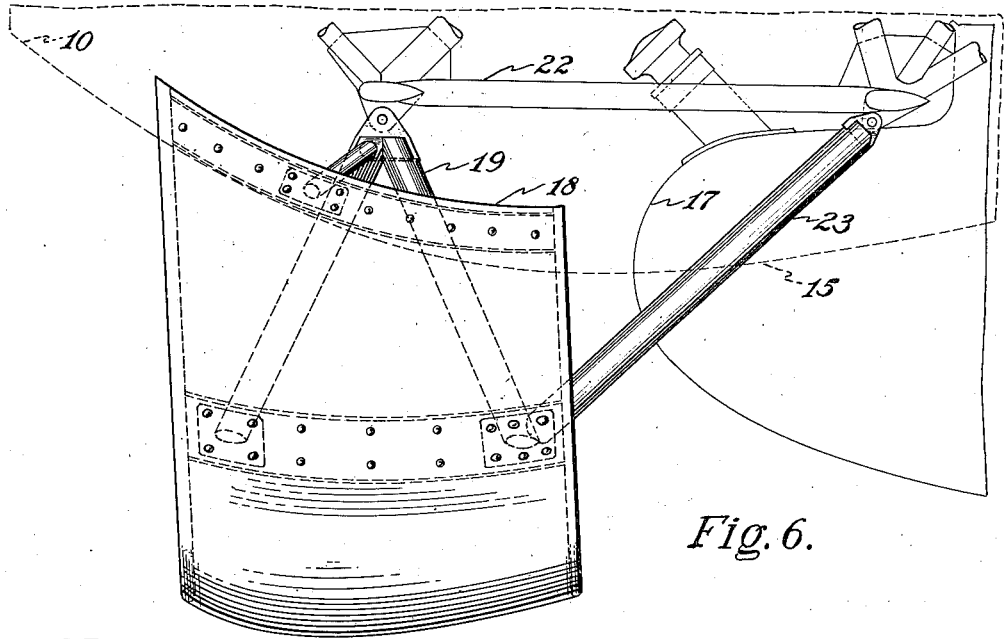
Fig. 6 is an enlarged detail elevation of the air flow control vane as applied to an aircraft such as that shown in Figs. 1 and 2.
Figure 7:
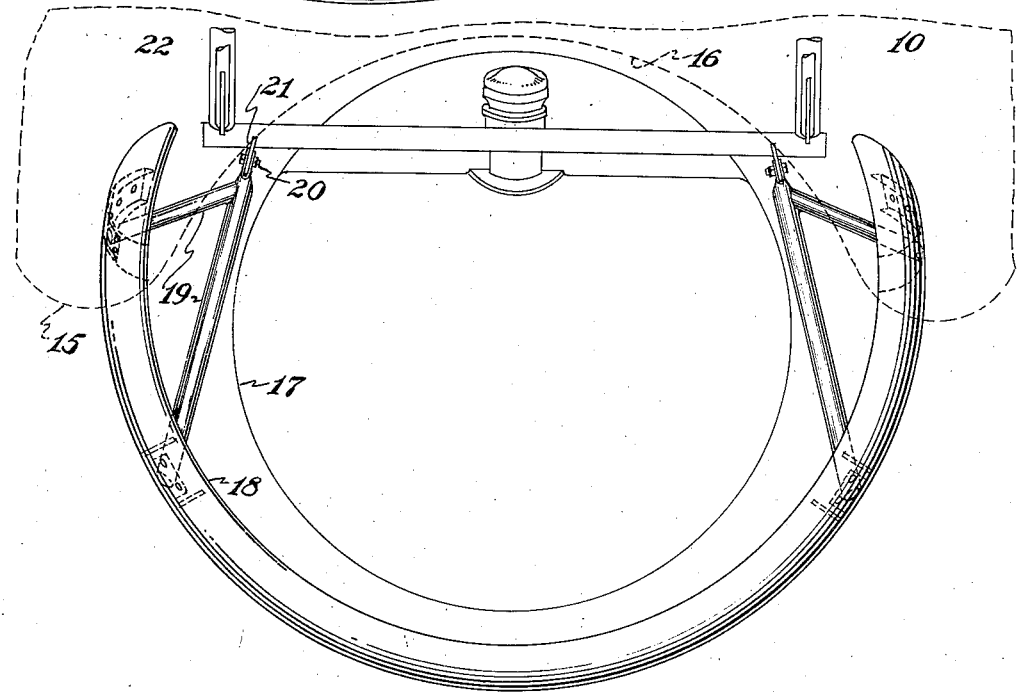
Fig. 7 is a front elevation of the air flow control vane and associated elements shown in Fig. 6.

The figures of the drawings depict an aircraft fuselage 10 provided with the usual power plant 11, propeller 12, wings 13 and retractable landing gear 14. In the form of aircraft shown, the fuselage includes laterally spaced projections 15 on its lower side, the projections including between them a longitudinal channel 16. Within this channel, an auxiliary body 17 is suspended, this body as shown in the first embodiment, being an extra fuel tank. This fuel tank is generally of streamline form, but may have the effect in flight of causing diversion of air flow thereover, whereby air flow contacting the empennage at the rear of the fuselage 10 may be so altered as to cause control difficulties and vibration, as compared with the same aircraft when the auxiliary body 17 is detached. It has been found that an airfoil vane 18 placed forwardly of the body 17 below the fuselage, has a corrective effect on the air flow by which the aforesaid vibration and control difficulties are eliminated. This vane comprises a segment of a ring, as shown in Figs. 6 and 7, the form thereof in front elevation, as shown in Fig. 7, embracing the frontal form of the tank 17. The cross section of the vane 18 is an airfoil, as indicated in Fig. 6, and is so arranged as to angle of incidence and chord as to properly control the air passing thereover and therethrough. The proper conformation of the vane 18 is probably best ascertained by experimentation.

Attachment of the vane 18 is effected by means of brace struts 19 bolted as at 20 to suitable fittings 21 formed on part of the fuselage structure 22. An additional strut 23 may be provided to assume drag and anti-drag stresses imposed upon the vane.

Figs. 3, 4 and 5 show substantially the same type of apparatus except that the auxiliary body comprises a bomb 24 supported within the fuselage channel 16. The bomb requires a supporting and releasing structure which includes a pair of laterally spaced longitudinal struts 25 engaging the bomb at their rearward ends through fittings 26. These struts 25 are carried on their forward ends by part of the fuselage structure 27. Thus, the longitudinal struts 25 form a convenient means to which the segmental vane 18 may be attached, by means of suitable struts 28.

Aerodynamically, the effect of the vane 18 when used either with the auxiliary fuel tank or with the bomb, is the same, the only difference between the various showings being that of supporting structure for the vane. It is apparent that other suitable supporting structure might be developed by those skilled in the art for effectively mounting the vane 18 on the fuselage and in proper relationship to the auxiliary body.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In aircraft having an external bomb releasably carried therebelow and having bomb supporting gear forward of said bomb, an airfoil vane carried by said supporting gear forwardly of said bomb for controlling air flow over the bomb, and, by its forward location, providing clearance for the nose of said bomb upon release thereof.

2. In aircraft having a body releasably mounted in spaced relation below said aircraft, a substantially semi-circular airfoil section vane mounted ahead of the nose of said body for controlling the airflow thereover, and for providing a clearance between the rear of said vane and the nose of said body upon release of the latter.

THEODORE P. WRIGHT.